Jan. 12, 1965  A. E. MURRAY ETAL  3,165,383
VALVED MONOMER INDUCTION TUBE AND REACTOR
Filed April 28, 1961

INVENTORS
A. E. MURRAY
D. H. CLARK
BY
Hudson and Young
ATTORNEYS

3,165,383
VALVED MONOMER INDUCTION TUBE AND
REACTOR
August E. Murray and Delphin H. Clark, Bartlesville, Okla., assignors to Phillips Petroleum Company, a corporation of Delaware
Filed Apr. 28, 1961, Ser. No. 106,366
4 Claims. (Cl. 23—285)

This invention relates to apparatus for the introduction of a fluid into a reaction vessel. In one aspect, the invention relates to a valve for the prevention of retrograde flow from a reaction vessel to an induction tube.

Many chemical processes require the introduction of a fluid into a reaction vessel which is maintained under a pressure. The introduction of the reactant material into the reaction vessel is generally made possible by the utilization of a pressure greater than the pressure inside the reaction vessel. However, it frequently happens that due to a sudden surge of pressure within the vessel, or a similar drop in the pressure of the incoming fluid, that the pressure inside the vessel exceeds the pressure of the incoming fluid thereby resulting in the flow of fluid from the vessel into the induction tube. This retrograde flow of fluid is frequently undesirable since it may result in a plugging of the induction tube by reaction product thereby preventing the further induction of reactants into the vessel without a costly repair or cleaning job.

For example, olefins are frequently polymerized in the presence of a catalyst and a diluent, either as a batch or as a continuous process, by processes such as described in the patent of J. P. Hogan et al., U.S. 2,825,721. This patent describes a catalyst which comprises, as the sole essential effective catalytic ingredients, chromium oxide and at least one material selected from the group consisting of silica, alumina, zirconia and thoria, at least part of the chromium being in the hexavalent state at the initial contacting of hydrocarbon with said catalyst. Although either liquid phase or vapor phase operation can be employed, it is generally most satisfactory to contact the monomers and catalyst in the presence of a liquid hydrocarbon diluent at pressures sufficient to maintain the reaction mixture substantially in the liquid phase, preferably from atmospheric and below to 1,000 p.s.i. or higher. Often a pressure of at least 100 p.s.i. to 700 p.s.i. is preferred. Temperatures are maintained above the solution temperature of the polymer, for example temperatures of 0 to 500° F. preferably 100 to 500° F., more preferably from 225 to 450° F. In one embodiment of the method of Hogan and Banks, supra, particulate polymer is produced in a diluent which is not a solvent for the polymer at the operating conditions.

Regardless of the method used for production, it is necessary to introduce the monomer or monomers into the reaction vessel at a pressure exceeding the pressure within the vessel. Due to reaction surges or a decrease in monomer pressure it is possible for the reaction vessel pressure to exceed the incoming fluid pressure. This is particularly undesirable in the case of a normally solid polymer which may then back up into the monomer induction tube and, upon cooling, solidify and agglomerate thereby plugging the induction tube and preventing the further introduction of monomer.

It is an object of this invention to provide apparatus for introducing fluids into a reaction vessel.

It is another object of this invention to provide apparatus for introducing fluids into a reaction vessel which will prevent retrograde flow in the event the reaction vessel pressure exceeds the incoming fluid pressure.

These and other objects of the invention are broadly accomplished in apparatus suitable for conducting chemical reaction processes comprising a reactor vessel and a fluid conduit for introducing fluids into said vessel by the improvement comprising valve means disposed in said fluid conduit cooperating with an urging means for closing said valve so as to preclude retrograde flow when the fluid pressure within the reactor exceeds the pressure of the incoming fluid.

These and other objects of the invention will be more clearly understood from the following detailed description and discussion.

The invention can best be understood by a detailed description of the accompanying drawings.

Although this drawing and invention are described in detail with reference to the utilization of particular materials and a particular process, it is to be understood that the invention is not thereby limited.

Figure 1:
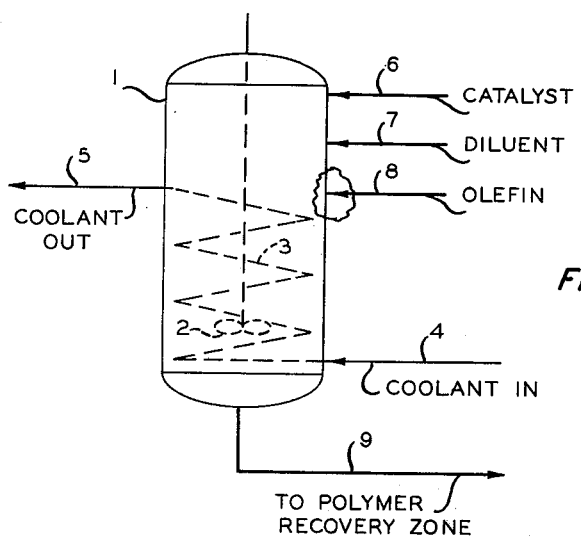
FIGURE 1 is a diagrammatic presentation of a general apparatus for the polymerization of an olefin.

Referring to the drawings in detail and to FIGURE 1 in particular, reference numeral 1 designates a reaction vessel suitable for the polymerization of olefins to polyolefins in the presence of a catalyst and a diluent. The reaction vessel may be adaptable for batch or continuous operation and may have any form suitable for the production of polymers. The contents within the reactor are continuously agitated by agitator 2 driven by a motor not shown. Since the olefin polymerization reaction is an exothermic reaction, the reaction vessel is preferably cooled, such as by cooling coils 3. A coolant is introduced thereto through conduit 4 and removed through conduit 5. Catalyst, diluent and olefin monomer are introduced to the reactor through conduits 6, 7, and 8 respectively in the proper proportions. The polymer thus produced is then removed either periodically or continuously through conduit 9 to the polymer recovery zone. Any suitable method or apparatus for the recovery of the polymer from solution or dispersion may be used.

Figure 2:
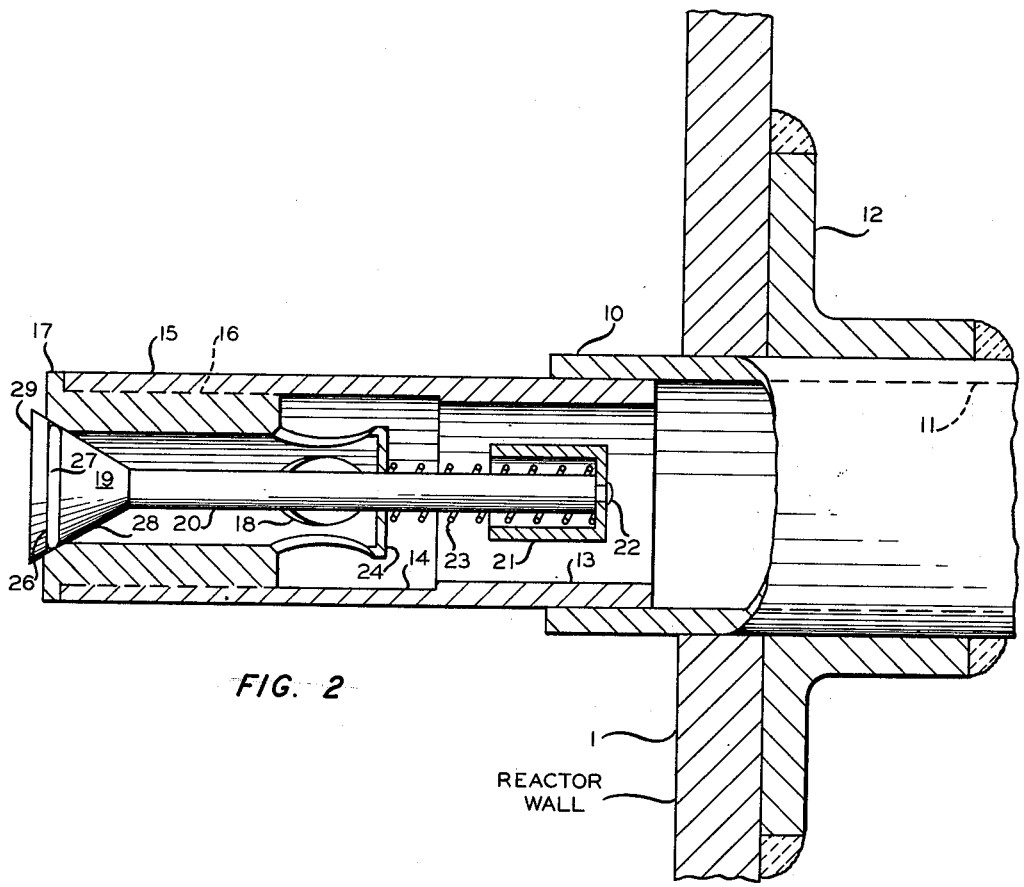
FIGURE 2 is a cross-sectional view of the monomer induction tube of this invention.

FIGURE 2 represents a cross-sectional view of the induction tube at the point of juncture of conduit 8 with reaction vessel wall 1. The monomer induction tube 10 is conventionally attached to the reactor wall 1 by collar 12 which is welded thereto although any other suitable attaching means may be used. Induction tube 10 passes through an aperture in wall 1 extending a short distance into the interior of the reaction vessel. Monomer induction tube 10 is a cylinder having a bore sufficiently large to permit the introduction of monomer into the reaction vessel. By the apparatus of this invention retrograde flow from the interior of the vessel into the induction tube bore 11 is prevented by means of a valve 19. Reference numeral 15 represents a solid wall valve housing which is disposed for a short distance within the bore 11 thereby connecting the interior of the reaction vessel with the interior fluid passageway of the induction tube. Housing 15 is a cylinder having a bore 13 with a slightly enlarged section 14. Main valve body 17 is positioned within the interior of housing 15 having a fixed position relative to said housing preferably threadably mounted by threads 16 to said housing at the end adjacent to the interior of the reaction vessel. Valve body 17 is a solid wall tubular body disposed within said valve body to assist in the axial positioning of the hereinafter described valve stem, open at the end adjacent to the reaction zone entrance and in open communication with bore 14 and thus the fluid passageways 11 and 13 by means of an aperture 18. This aperture may be of any type. One type of suitable aperture is the drilled orifice illustrated in the drawing. Located within the reaction zone entrance to the interior of the valve body 17 is a valve head 19, preferably conically shaped. Preferably, valve 19 has a circumferential groove 26 permitting the utilization of an O-ring 27 in sealing engagement with a valve seat in the interior wall of valve body 17 so as to prevent the retrograde flow of reaction zone material into the induction tube when valve 19 is in the closed position. Under normal operation when the olefin pressure exceeds the reaction zone pressure the monomers proceed through bores 11, 13 and 14 through aperture 18 into the passageway in valve body 17 and exert a pressure against face 28 of valve 19 forcing the valve toward the reaction zone thereby permitting passage of the fluid from the interior of valve body 17 through the passageway between valve 17 and valve 19. Attached to valve 19 is a valve stem 20 which has attached thereto means for resisting the movement of valve 19 longitudinally toward the reaction vessel. As shown in the drawing, one suitable means for resisting said longitudinal movement is a spring 23 which is maintained under compression between retaining member 21 held in place by brad 22 and the wall 24 of the valve body 17. Therefore, by this apparatus a positive pressure is required by the monomer to overcome the resistance of spring 23 to the movement of valve 19 longitudinally toward the reaction zone. If the reaction zone pressure should exceed the monomer pressure, the pressure against face 29 combined with the force contained in spring 23 will move the valve 19 to a closed position thereby precluding the retrograde flow of reactants from the reaction zone into the monomer tube.

The selection of the particular orifice sizes as well as the particular spring is well within the skill of the art. The selection of the particular spring size depends upon the incoming olefin pressure as well as the operating pressure within the reaction zone.

Changes may be made in the combination and arrangement of parts as heretofore set forth in the specification and shown in the drawings. It is understood that any modification of the precise embodiment of the invention may be made within the scope of the following claims without departing from the spirit of the invention.

We claim:

1. In apparatus suitable for conducting a chemical reaction process comprising a reactor vessel and a fluid conduit in open communication with said vessel, the improvement comprising in combination: valve means disposed in said fluid conduit precluding flow from said vessel into said fluid conduit comprising a solid wall valve body having a fixed position relative to the interior wall of said conduit, said valve body having one closed end opposite the entrance to the interior of the reactor with said body having a fluid passageway therethrough in communication with said conduit and the interior of said reactor; a reciprocal valve head disposed in said passageway adapted to close said passageway in one position; a valve stem attached to said valve head axially disposed in said valve body adapted to move longitudinally therein; a valve seat in said valve body adapted to receive the valve head in the closed position of the valve stem; and urging means cooperating with said valve stem and reacting against the closed end of said valve body to move said valve head into the closed position in response to a positive reactor pressure against said valve head.

2. In apparatus suitable for the polymerization of an olefin monomer under pressure comprising a reactor vessel; conduit means for introducing monomer into said vessel; and a fluid conduit in open communication with the interior of said vessel, the improvement comprising in combination: valve means disposed in said fluid conduit precluding retrograde flow from said vessel into said fluid conduit comprising valve housing having a bore therethrough disposed in said fluid conduit; a solid wall valve body axially disposed in said bore having a fixed position relative to the interior wall of said housing and having one closed end opposite the entrance to the interior of the reactor with said body having at least one aperture in the wall of said body to provide a fluid passageway therethrough in open communication with said bore and the interior of said reactor vessel; a reciprocal valve head disposed in said passageway for precluding flow through said passageway adapted to close said passageway in one position; a valve stem attached to said valve head axially disposed in said valve body adapted to move longitudinally therein; a valve seat in the interior wall of said valve body adapted to receive said valve head in the closed position of the stem; a retaining member attached to said stem; a spring positioned on said stem and maintained under compression between the closed end of said valve body and said retaining member moving said valve head to the closed position when the fluid pressure in the interior of said reactor exerts a positive pressure on said valve head.

3. In apparatus suitable for the polymerization of an olefin monomer under pressure comprising a reactor vessel; conduit means for introducing monomer into said vessel; and a fluid conduit in open communication with the interior of said vessel, the improvement comprising in combination: valve means disposed in said fluid conduit precluding retrograde flow from said vessel into said fluid conduit comprising valve housing having a bore therethrough disposed in said fluid conduit; a solid wall valve body axially disposed in said bore and threadably mounted to the interior wall of said housing and having one closed end opposite the entrance to the interior of the reactor with said body having a plurality of apertures in said body wall providing a fluid passageway therethrough in communication with said bore and the interior of said reactor vessel; a reciprocal conical valve head disposed in said fluid passageway alternately permitting and precluding flow through said passageway; a valve stem attached to said valve head axially disposed in said valve body adapted to reciprocate longitudinally therein; a valve seat in the interior wall of the valve body adapted to receive the valve head in the closed position of said valve stem; a circumferential groove in the outer surface of the valve head adjacent to the interior of said reactor; an annular sealing element disposed in said circumferential groove and in sealing engagement with said valve head and said valve seat when said valve is in the closed position; a retaining member attached to said stem opposite said valve head; a spring positioned on said stem and maintained under compression between the closed end of said valve body and said retaining member moving said valve head to the closed position when the fluid pressure in the interior of said reactor exerts a positive pressure on said valve head.

4. In apparatus suitable for the polymerization of an olefin monomer under pressure comprising a reactor vessel; conduit means for introducing monomer into said vessel; and a fluid conduit in open communication with the interior of said vessel, the improvement comprising in combination: valve means disposed in said fluid conduit precluding retrograde flow from said vessel into said fluid conduit comprising a valve housing having a bore therethrough disposed in said fluid conduit, said housing thereby being in open communication with the interior of said reaction vessel; a solid wall valve body axially disposed in said bore and threadably mounted to the interior wall of said housing open at the entrance to the reaction vessel and having one closed end opposite the entrance to the interior of the reactor with said body having a plurality of apertures in said body wall providing a fluid passageway therethrough in communication with said bore and the interior of said reactor; a reciprocal conical valve head axially disposed in said passageway alternately permitting and precluding flow through said passageway; a valve stem attached to said valve head axially disposed within the interior of said valve body adapted to reciprocate longitudinally therein, said valve stem extending through said valve body into said bore; a valve seat in the interior wall of said valve body adapted to receive the valve head in the closed position; a circumferential groove in the outer surface of said valve head adjacent the interior of said vessel; an annular sealing element disposed in said circumferential groove and in sealing engagement with said valve head and said valve seat; a retaining member attached to said stem positioned exteriorly of said valve body; a helical spring positioned on said stem exterior of said valve body and maintained under compression between the closed end of said valve body and said retaining member moving said valve head to the closed position when the pressure within the reaction vessel exceeds the pressure within said fluid conduit.

References Cited in the file of this patent
UNITED STATES PATENTS

| | | |
|---|---|---|
| 1,143,293 | Luehrs | June 15, 1915 |
| 1,757,628 | Hale | May 6, 1930 |
| 2,478,707 | Purvin | Aug. 9, 1949 |
| 2,643,183 | Efferson | June 23, 1953 |
| 2,820,673 | Zubaty | Jan. 21, 1958 |